(12) United States Patent
Kaku et al.

(10) Patent No.: US 6,721,261 B2
(45) Date of Patent: Apr. 13, 2004

(54) INFORMATION RECORDING/REPRODUCING APPARATUS WITH LASER DRIVER

(75) Inventors: Toshimitsu Kaku, Sagamihara (JP); Akihiro Asada, Chigasaki (JP); Takashi Hoshino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/143,932

(22) Filed: May 14, 2002

(65) Prior Publication Data

US 2002/0126609 A1 Sep. 12, 2002

Related U.S. Application Data

(62) Division of application No. 09/392,620, filed on Sep. 9, 1999, now Pat. No. 6,414,932.

(30) Foreign Application Priority Data

Jul. 30, 1999 (JP) .......................................... 11-216331

(51) Int. Cl.$^7$ ................................................ G11B 7/00
(52) U.S. Cl. ..................................... 369/116; 369/47.5
(58) Field of Search ............................. 369/116, 47.5, 369/53.26, 53.32, 53.33

(56) References Cited

U.S. PATENT DOCUMENTS

| | | | | |
|---|---|---|---|---|
| 4,733,398 A | * | 3/1988 | Shibagaki et al. ............ | 369/116 |
| 5,572,502 A | * | 11/1996 | Naruse et al. ............... | 369/116 |
| 6,031,800 A | * | 2/2000 | Narumi et al. ................ | 369/48 |
| 6,104,682 A | | 8/2000 | Konishi ..................... | 369/44.34 |
| 6,226,243 B1 | * | 5/2001 | Kobayashi et al. ............ | 369/48 |
| 6,493,305 B1 | * | 12/2002 | Hayashi et al. .......... | 369/59.12 |

* cited by examiner

*Primary Examiner*—Nabil Hindi
(74) *Attorney, Agent, or Firm*—Antonelli, Terry, Stout & Kraus, LLP

(57) ABSTRACT

An information recording/reproducing apparatus includes a semiconductor laser, a laser driver which drives the semiconductor laser, an optical system which focuses light emitted from the semiconductor laser on an information recording medium, a photodetector which detects light reflected from the information recording medium, and outputs a reflection light signal, a modulation circuit which modulates information in accordance with a predetermined rule, and outputs a binary signal representing the modulated information, and a calculation/control circuit which controls the modulation circuit. The laser driver includes a delay circuit, and receives the binary signal, generates a recording current signal corresponding to the binary signal through the delay circuit, and transmits an output of the delay circuit to the calculation/control circuit as a monitor signal. The calculation/control circuit generates a timing signal for sampling and holding the reflection light signal based on the monitor signal.

10 Claims, 5 Drawing Sheets

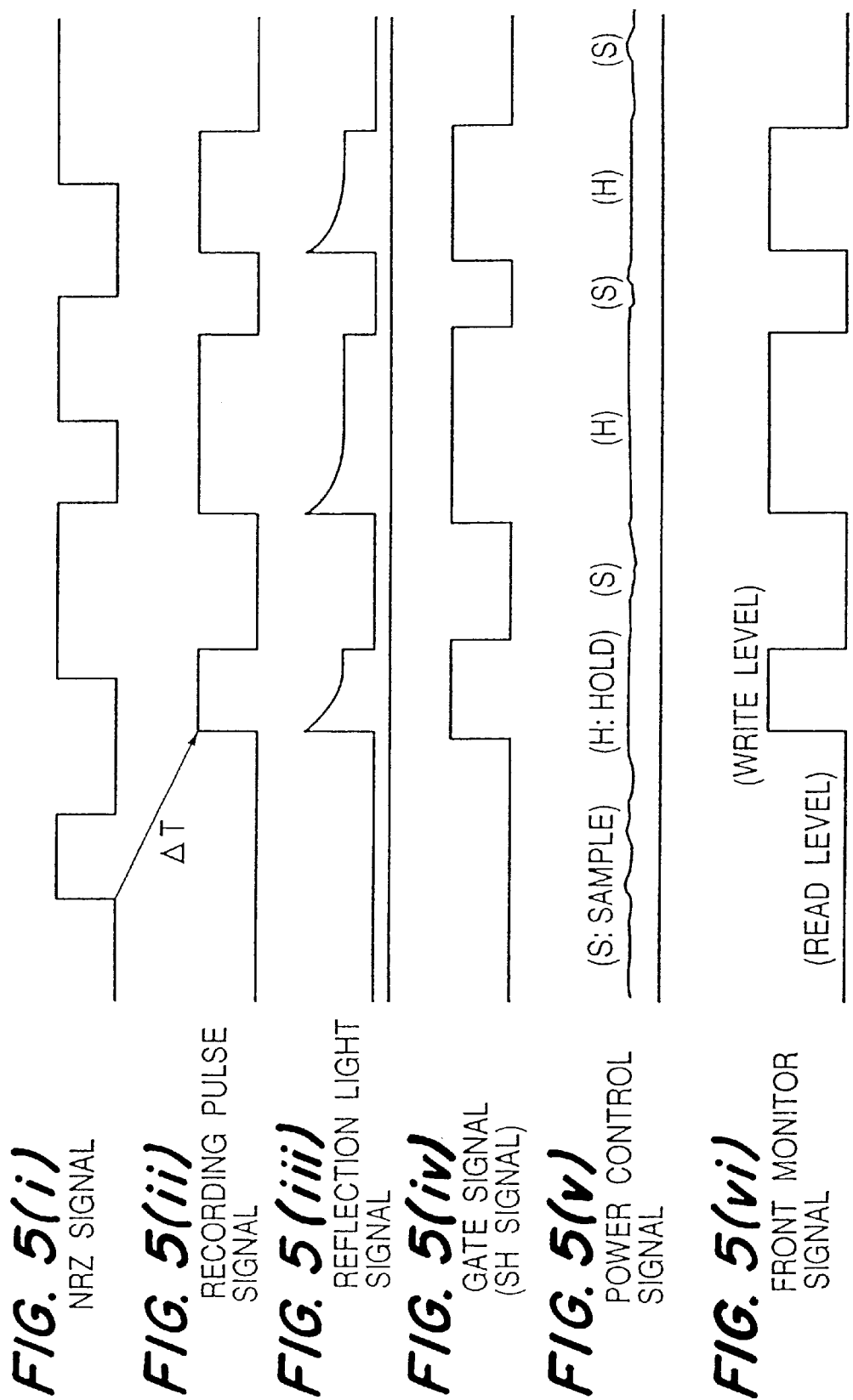

INFORMATION RECORDING/REPRODUCING APPARATUS WITH LASER DRIVER

CROSS-REFERENCE TO RELATED APPLICATIONS

This application is a division of application Ser. No. 09/392,620 filed on Sep. 9, 1999, now U.S. Pat. No. 6,414,932, the contents of which are hereby incorporated herein by reference in their entirety.

This application is related to application Ser. No. 10/143,933 filed on May 14, 2002, which is a continuation of application Ser. No. 09/392,620 filed on Sep. 9, 1999, now U.S. Pat. No. 6,414,932, the parent application of the present divisional application.

BACKGROUND OF THE INVENTION

1. Field of the Invention

The present invention relates to an information recording/reproducing apparatus for recording and reproducing information by irradiating a light beam from a laser, and in particular to an information recording/reproducing apparatus having a laser driver capable of generating a recording current signal corresponding to a binary signal by obtaining the binary signal, such as an NRZ (Nonreturn-to-Zero) signal, and a clock signal in synchronism therewith.

2. Description of the Related Art

An optical information recording/reproducing apparatus, wherein recording marks, such as hole pits, phase-change pits, pigment pits, magnetized domains, and so on, are formed on a recording film of a recording medium for recording information, and the information is reproduced by use of a reflection light from the recording medium, since a plurality of information recording mediums (hereinafter referred to as an "optical disc") can be used in an exchangeable manner, has a characteristic that a large amount of information can be recorded therein and reproduced therefrom, and therefore it is widely used as a large capacity external memory device for use with, for example, a personal computer and a large-sized computer.

In recent years, accompanying an increase in recording density thereof, it is required that the marks (or the pits) to be recorded on the surface of the information recording medium must be formed to be equal to or less than 0.5 $\mu$m in diameter, for example, and for achieving such forming of the marks, recording power must be divided by a timer pulse period (i.e., multi-pulsated), and further there is needed a power control for altering or changing the level thereof at various values (for example, 3 values or 4 values). Also, for optimizing the time distances between a group of the recording marks and a group of spaces located therebetween, there is needed an adaptive control for variably controlling the time positions and the pulse widths of the recording pulses which are divided depending upon adjacent space lengths and mark lengths (hereinafter this control is referred to as a "recording strategy control") when recording the marks.

For conducting such a recording strategy control, a risetime (Tr)-fall-time (Tf) characteristic of each pulse of the above-mentioned multi-pulses must be taken into consideration. In this instance, a time period of approximately several nanoseconds is needed for the Tr-Tf characteristic, and further for making the Tr-Tf characteristic operable at high speed corresponding to an increase in the disc rotational speed upon a requirement of high speed transfer recording. However, it is very difficult to transfer the recording pulses up to the laser mounted on an optical head without deterioration in the Tr-Tf characteristic of the waveforms thereof. In the construction of the prior art, in particular a circuit for executing the recording strategy control is disposed on a substrate at a side of modulation circuits, and therefore the transmission length for the recording pulse waveforms from the substrate up to the optical head needs to be long in the construction thereof.

SUMMARY OF THE INVENTION

An object of the present invention, for solving the problems mentioned above, is to provide an information recording/reproducing apparatus with which high density recording and high speed transfer recording can be performed.

Further, another object of the present invention is to provide an information recording/reproducing apparatus providing improved reliability in recording and reproducing operations of the information data into and from the information recording medium by use of a laser driver having a circuit for executing the recording strategy control on various recording mediums.

An outline of the present invention for achieving the above objects is as follows.

A laser driver capable of performing recording strategy control is disposed adjacent to a semiconductor laser element so as to reduce deterioration of the Tr-Tf characteristic in the drive current waveforms therefrom.

The laser driver can generate a recording current signal corresponding to a binary signal by obtaining the binary signal, such as an NRZ modulation signal from a modulation circuit, and a clock signal being synchronized therewith, and by making a PLL circuit disposed therein to oscillate at a recording frequency. However, when an oscillation condition of the PLL circuit becomes abnormal, a standard recording frequency also becomes abnormal, and therefore it is impossible to perform a normal recording operation. Accordingly, within the laser driver, there is provided a PLL unlock detection circuit for detecting the oscillation condition of the PLL circuit, and transmitting a detection signal from the unlock detection circuit to a calculation/control circuit for controlling the recording/reproducing operations so as to control the recording operation.

Here, assuming a case where the information data is recorded onto a CD-R disc, there is a necessity to sample-hold a DC level corresponding to a reproducing power level among pulse modulated reflection lights for the purpose of detecting a servo signal or the like when recording the CD-R. For this, a delay circuit is provided for the purpose of bringing the NRZ modulation signal from the modulation circuit into line with the reflection light in timing thereof. In this instance, there occurs a problem that a cost increases due to the provision of the delay circuit in addition to the modulation circuit.

Accordingly, upon the basis of the construction according to the present invention mentioned above in which the binary signal and the clock signal being synchronized therewith are obtained so that a recording current signal can be generated corresponding to the binary signal through the delay circuit disposed therein, an output of the delay circuit is transmitted as a monitor signal to the calculation/control circuit for managing the recording/reproducing operations, thereby generating a timing signal for conducting the sample-hold of the reflection light from the recording medium based upon the monitor signal.

BRIEF DESCRIPTION OF THE DRAWINGS

FIGS. 5(i)–5(vi) show a timing chart of signals in the second embodiment.

DETAILED DESCRIPTION OF THE INVENTION

Hereinafter embodiments according to the present invention will be fully explained by referring to the attached drawings.

First Embodiment

Figure 1:
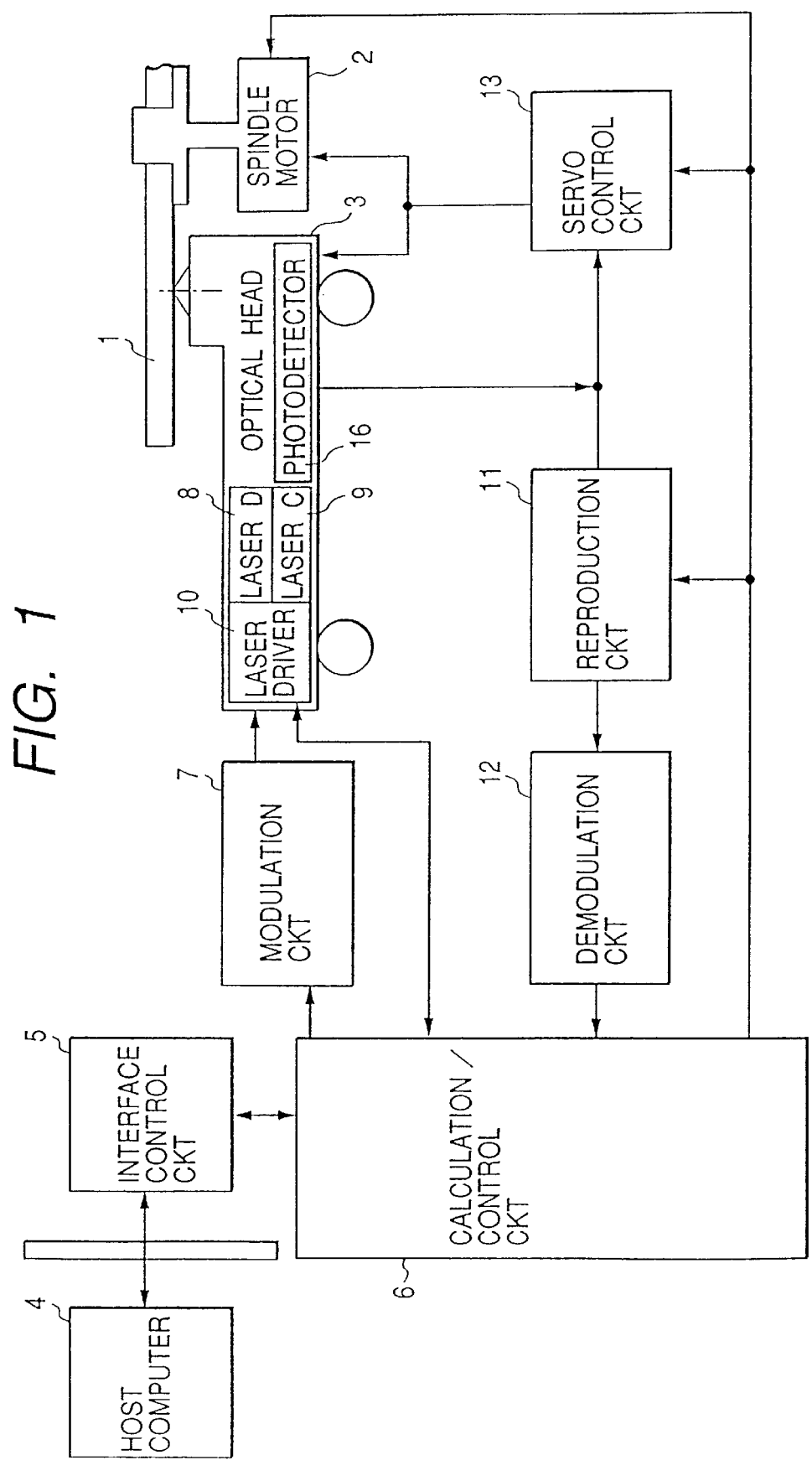
FIG. 1 shows the construction of a first embodiment of an information recording/reproducing apparatus according to the present invention.

FIG. 1 shows an example of an information recording/ reproducing apparatus according to an embodiment of the present invention. An information recording medium (or optical disc) 1, into and from which information is recorded and/or reproduced, is held by a spindle motor 2 to be rotated therewith. As a recording layer or film for forming the information recording medium 1, there can be listed a phase-change type recording film (GeSbTe), an organic pigment film, or an opto-magnetic type recording film (TbFeCo), for example. Recording and reproducing of the information are performed into and from the information recording medium 1 by means of an optical head 3, having semiconductor laser elements D 8 and C 9 for emitting a light beam so as to perform the recording and reproducing of information, a laser driver 10 for driving the semiconductor laser elements D 8 and C 9, an optical system (not shown in the figure) for forming an optical spot of approximately 1 μm in diameter from the light beam emitted from the semiconductor laser elements D 8 and C 9 upon a disc surface, and a photodetector 16 for performing an optical spot control, such as reproducing of information, automatic focusing, track tracing, etc., by use of reflection light from the information recording medium 1. Also, the optical head 3 is constructed with a linear motor (not shown in the figure) for driving and positioning the optical head 3 itself with high speed in a radial direction of a disc. In the present embodiment, the optical head 3, a calculation/control circuit 6, a modulation circuit 7, a reproduction circuit 11, and a servo control circuit 13 are connected to each other with signal lines, such as signal lines in a flexible cable. Also, an interface control circuit 5, the calculation/control circuit 6, the modulation circuit 7, the reproduction circuit 11, a demodulation circuit 12, and the servo control circuit 13 are formed on a circuit board being separated from the optical head 3.

Ordinarily, an optical disc device constituting the information recording/reproducing apparatus is connected to a host computer 4 (hereinafter referred to as a "host"), such as a personal computer, a work station, etc., through an interface cable in accordance with a standard of, for example, SCSI (Small Computer System Interface) or ATAPI (Advanced Technology Attachment Packet Interface), thereby interpreting commands including commands and information data from the host 4 by the interface control circuit 5 within the optical disc device, so as to execute the recording and reproducing operations and further to execute a seek operation through the calculation/control circuit 6 being constructed with a microcomputer.

First of all, an explanation will be given of the recording operation in the optical disc device. A recording command is issued under the condition where recording data has added thereto recording position information (i.e., address information) for the information recording medium 1 from the host 4, and after being stored into a buffer memory (not shown in the figure) within the calculation/control circuit 6, it is transferred in a time sequential order to the modulation circuit 7. Then, in the modulation circuit 7, the recording data is converted into a series of codes corresponding to a run length limited (RLL) code, for example, (1,7) RLL code, (2,7) RLL code, or (2,10) RLL code, which is used in DVD (Digital Versatile Disc), or an EFM (eight-fourteen modulation) code corresponding to the CD format, and is further converted into pulse trains (i.e., binary signals) corresponding to the shapes of recording marks to be formed on the recording film. Those pulse trains (hereinafter referred to as an "NRZ signal" in general) are introduced into the laser driver 10 on the optical head 3 which drives a selected one of the semiconductor laser elements D 8 and C 9, causing the selected one of the semiconductor laser elements D 8 and C 9 to emit a pulse light beam by turning ON and OFF depending upon the NRZ signal, thereby forming recording marks on the information recording medium 1 by means of a spot focused with the optical head 3.

FIG. 1 shows two semiconductor laser elements D 8 and C 9. One semiconductor laser element (for example, a laser diode) D 8 generates a light beam having a wavelength of 650 nm for use in recording the information data relating to the DVD (i.e., DVD-RAM/–R/–RW+RW), and has an output power equal to or higher than 30 mW. The other semiconductor laser element (for example, a laser diode) C 9 generates a light beam having a wavelength of 780 nm for use in recording the information data relating to the CD (i.e., CD-R/–RW), and has an output power equal to or higher than 50 mW. In the present embodiment, the laser driver 10 has two output terminals, and therefore it is possible to cause the semiconductor laser elements D 8 and C 9 to emit the respective light beams.

Next, an explanation will be given of the reproducing operation in the optical disc device. When reproducing, the light spot from the optical head 3 is positioned on a track on the information recording medium 1 (for example, in a case of the DVD-RAM), thereby reproducing the signal from that track. First, when the laser diode D 8 is driven to emit a DC light beam through the laser driver 10 on the optical head 3 so as to irradiate upon the recording film on the information recording medium 1, there can be reflection light corresponding to the recording marks. The reflection light is received by the photodetector 16 within the optical head 3 for photoelectric conversion thereof, and an electric signal can be obtained therefrom. After being inputted into the reproduction circuit 11, the electric signal is reproduced as data. Ordinarily, the reproduction circuit 11 is constructed with an automatic gain control circuit (AGC) for maintaining an amplitude of the electric signal constant, a waveform equalizer circuit (EQ) for compensating for deterioration in an optical space frequency, a low pass filter (LPF), a binarization circuit, a PLL (Phase-Locked Loop) circuit, and a discrimination circuit, wherein the reproduced signal is converted into data which is discriminated after the binarization operation thereof. The discriminated binary data is inputted into the demodulation circuit 12, and original data is restored by demodulating the discriminated binary data with the (1,7) RLL code, the (2,7) RLL code, the (2,10) RLL code, or the EFM code. The demodulated data is inputted into the calculation/control circuit 6 to be transferred from the interface control circuit 5 to the host 4 in response to a reproducing command from the host 4.

In the photodetector 16 within the optical head 3, it is possible to detect not only the data reproduction signal, but also an automatic focus signal for the focus control of the light spot on the recording film and a track tracing signal for the track trace control of positioning the spot on an arbitrary track, and then the automatic focus signal and the track tracing signal for the light spot control are inputted into the servo control circuit 13. The servo control circuit 13 is constructed with an error signal generating circuit, a phase compensation circuit, and a driver circuit (none of which are shown in the figure), thereby executing the recording and reproducing operations of information by positioning the optical head 3 on the arbitrary track.

By referring to FIG. 2, a detailed explanation will be given of the laser driver 10 which is installed or mounted on the optical head 3. A serial interface control unit 100 takes in the setting values of various registers which are supplied through serial transmission thereof from the calculation/control circuit 6, and then converts them into parallel ones, so as to write the setting values into the corresponding registers. Further, SEN is a signal for bringing the serial interface control unit 100 under an operating condition thereof, SCLK a clock signal for the serial interface control unit 100, and SDIO a data signal for the serial interface control unit 100.

A register 101 memorizes a reproducing power level "Pread" therein. A Read DAC 102 is constructed with a digital-to-analog converter circuit for outputting a reading drive current "Iread" corresponding to the value "Pread" in the register 101. A HFM (High Frequency Module) 103 superimposes a high frequency current "Ihf" onto the drive current for the laser diode D 8 when reproducing.

A recording current generation unit 105 is constructed with a Pa register 106 for memorizing a recording power Pa, a Pb register 107 for memorizing a recording power Pb, a Pc register 108 for memorizing a recording power Pc, a Pd register 109 for memorizing a recording power Pd, a selector for selecting any one of the outputs from the registers 106–109, and a Write Power DAC 111 which is constructed with a digital-to-analog converter circuit for outputting a recording drive current "Iwrite" corresponding to the value of the recording power selected from the registers 106–109.

Also, there are provided a FS (Full Scale) DAC 113 which is constructed with a digital-to-analog converter circuit for outputting a current corresponding to a "Pmax" value memorized in a "Pmax" register 112 as a reference or standard current "Iref". A write strategy control unit 104 is able to generate a timing signal (i.e., a control signal "Px-select" for selecting the Pa-Pd registers 106–109) upon the basis of the NRZ signal (binary signal) supplied from the modulator circuit 7, a clock signal "chCLK", and a control signal "WRG" for setting up the recording and reproducing conditions.

The write strategy control unit 104 includes a delay circuit 114 for realizing the write strategy control, according to which the recording pulse is generated depending upon the NRZ signal inputted, and a time position of the pulse and a pulse width thereof are adaptively and variably controlled, and also includes a PLL circuit 115 for supplying a stable recording frequency in synchronism with the clock signal "chCLK" received from the outside.

The PLL circuit 115 is provided, not on a substrate or circuit board, but within the laser driver 10, and the transmission of the NRZ signal is conducted with lowering the frequency of the clock signal "chCLK", and also an oscillation is made in synchronism with the normal recording frequency by the PLL circuit 115 within the laser driver 10, and thereby it is possible to reduce an ill influence upon-adjacent signal lines (for example, the signal lines in the flexible cable) and/or an ill influence, such as extraneous radiation generated when high frequency signals are generated, when the high frequency signals are transmitted from the calculation/control circuit 6 and the modulation circuit 7, which are ordinarily disposed on the substrate or circuit board, up to the optical head 3 which cannot be disposed on the substrate or circuit board.

However, although the calculation/control circuit 6 for controlling the optical disc device as a whole can decide or judge an abnormality of the clock signal "chCLK" which is supplied to the PLL circuit 115 by controlling the modulation circuit 7, it cannot decide the abnormality of the oscillating condition of the PLL circuit 115 within the laser driver 10. Accordingly, in a case when the oscillation condition of the PLL circuit 115 becomes abnormal in spite of the clock signal "chCLK" supplied thereto being normal, there occurs a problem that the recording operation is not actually conducted normally onto the information recording medium 1, though it is decided as being done normally by the optical disc device itself.

Accordingly, an unlock detection circuit 116 is provided for detecting the oscillation condition of the PLL circuit 115 within the laser driver 10, and a detection signal from the unlock detection circuit 116 is sent as a monitor signal from a monitor circuit 117 to the calculation/control circuit 6 for controlling the recording/reproducing operations, thereby achieving the control of the recording operation.

Figure 3:
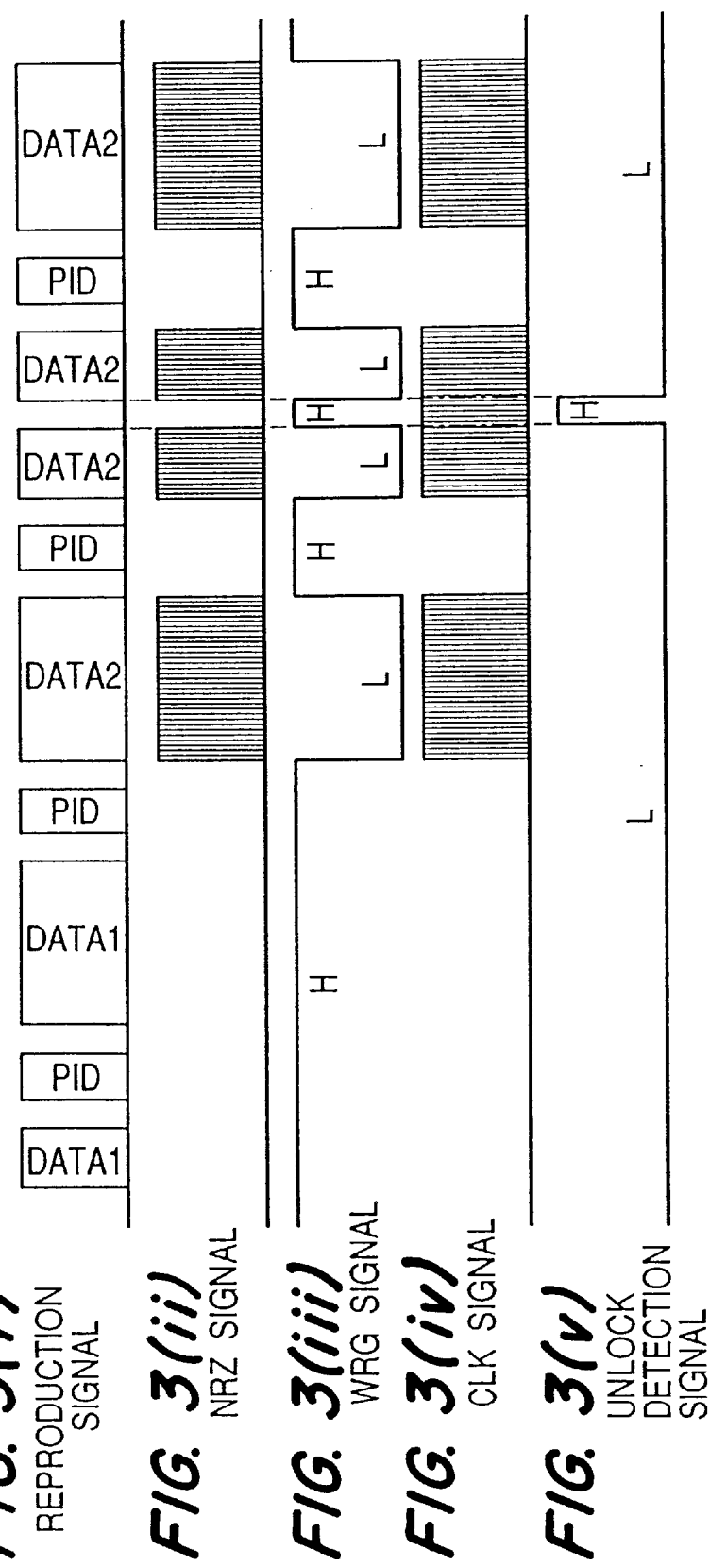
FIGS. 3(i)–3(v) show a timing chart of signals in the first embodiment.

Referring to FIGS. 3(*i*)–3(*v*), a detailed explanation will be given of the recording operation, assuming that the optical disc device mentioned above is a DVD-RAM drive and the information recording medium is a DVD-RAM disc, in particular when conducting the recording operation thereof. FIG. 3(*i*) depicts the reproduction signal in the reproduction circuit during the recording operation, wherein PID (Physical Identification Data) indicates an address being addressed by a unit of a sector, DATA1 the data which has been recorded, DATA2 a signal by the reflection light during the recording operation, and data recording is performed only in the data area of a sector number which is designated from a higher level in the system. FIG. 3(*ii*) depicts the NRZ signal supplied from the modulation circuit 7, and is supplied only for the data area. FIG. 3(*iii*) depicts the control signal WRG for setting up a recordable condition, i.e., "L" indicates the recording condition, while "H" indicates the reproducing condition. FIG. 3(*iv*) depicts a clock signal chCLK supplied from the modulation circuit 7, wherein the supply of chCLK is stopped for reducing the ill influences upon the adjacent signal lines when the PID is read out during the reproducing condition. In this instance, the PLL circuit 115 inside the laser driver 10 continues to oscillate, thereby maintaining the recording frequency. FIG. 3(*v*) depicts an output signal of the PLL unlock detection circuit 116, which is also the output of the monitor circuit 117.

The PLL unlock detection circuit 116, though normally outputting "L", switches the output to "H" in a case where the PLL circuit 115 detects the abnormal condition. This output is received by the calculation/control circuit 6, and then the calculation/control circuit 6 causes the modulation circuit 7 to output the signal WRG for setting up the recording condition by switching it to "H" while waiting for recovery of the PLL oscillation condition by stopping transfer of the NRZ signal from the modulation circuit 7. In a case where the PLL oscillation condition is recovered in the data area, the level of the unlock detection signal is switched to "L", thereby starting the recording again.

Also, in a case where an unlock condition of the PLL circuit 115 is detected, the clock signal chCLK is continued to be sent from the modulation circuit 7 to the PLL circuit 115 for the purpose of obtaining stability in PLL synchronization. Thereby, it is possible to stabilize the PLL oscillation condition within a short time period.

Second Embodiment

Figure 4:
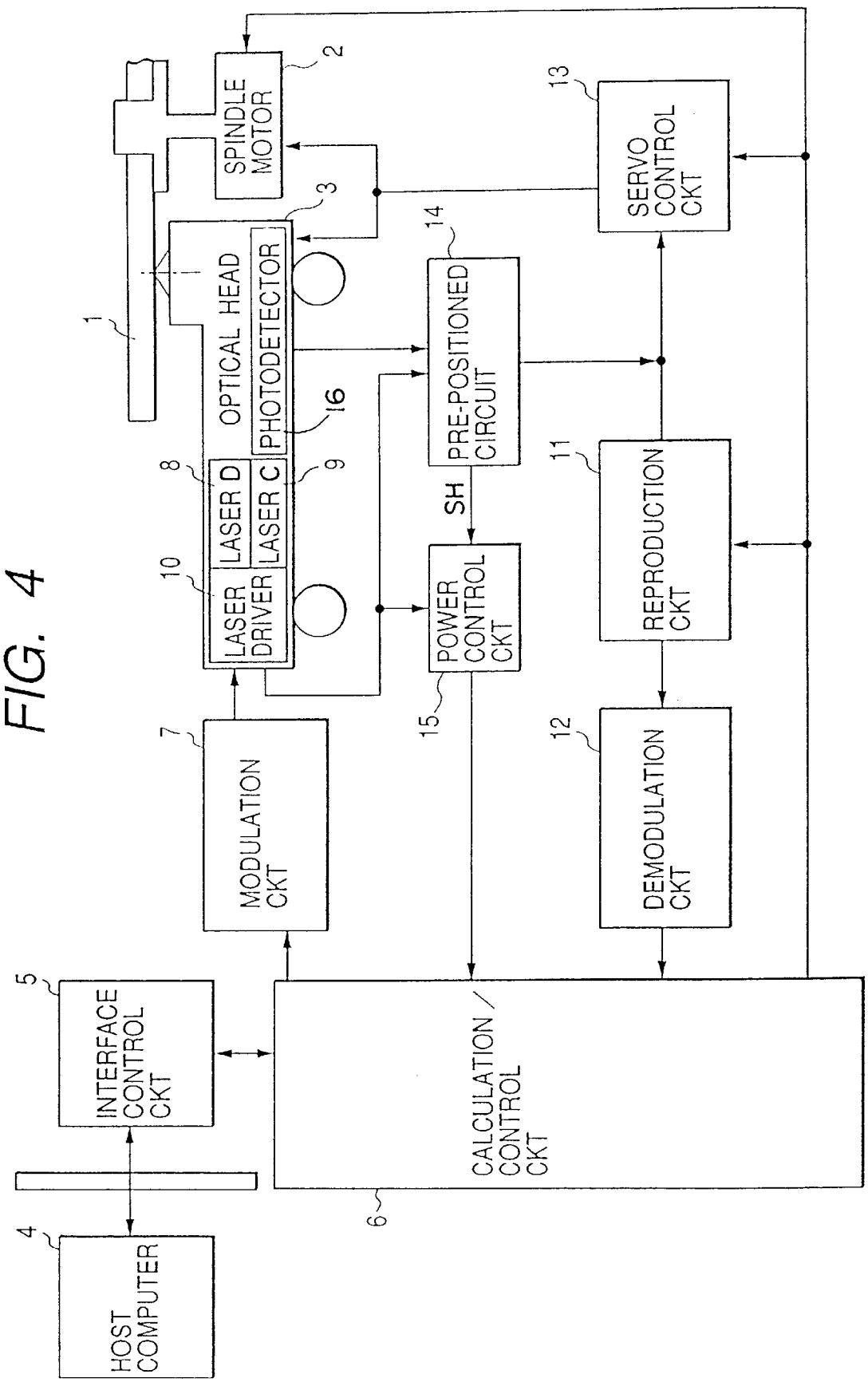
FIG. 4 shows the construction of a second embodiment of an information recording/reproducing apparatus according to the present invention.

By referring to FIG. 4, an information recording/reproducing apparatus according to a second embodiment of the present invention will be described. In the present embodiment, consideration is taken into account of a case where the laser driver 10 is applied for recording of the optical disc of the Write-Once type which is not rewritable, such as recording of a CD-R or DVD-R. Those recording mediums, such as CD-R/DVD-R, are ones made of an organic pigment film. The recording medium 1 is rotated while being held on a spindle motor 2, and the recording/reproducing of information is performed on the recording medium 1 by the optical head 3 having, in the same manner as in the first embodiment, semiconductor laser elements D 8 and C 9 for emitting a light beam so as to perform the recording/reproducing of information, a laser driver 10 for driving the semiconductor laser elements D 8 and C 9, an optical system (not shown in the figure) for forming an optical spot of approximately 1 μm in diameter from the light beam emitted from the semiconductor laser elements D 8 and C 9 upon a disc surface, and a photodetector 16 for performing an optical spot control, such as reproducing of information, automatic focusing, track tracing, etc., by use of reflection light from the information recording medium 1.

Hereinafter a detailed explanation will be given in a case of the CD-R. In recording of the CD-R, the recording operation is important. The data to be recorded on the CD-R recording medium is in the EFM code (hereinafter referred to as an "NRZ signal" in general) corresponding to the CD format, and ordinarily, the data of the CD-ROM or the CD-Audio is recorded on tracks of the information recording medium 1 designated by application software in the host 4, either continuously or separately. In FIG. 4, two semiconductor laser elements D 8 and C 9 are installed in the same manner as in FIG. 1, but for recording the CD related information data, a light beam having a wavelength of 780 nm from the semiconductor laser element C 9 is used.

Also, during the continuous recording operation of the CD-R, it is necessary to detect a servo signal or the like, and in particular it is necessary to sample-hold a DC level corresponding to the reproducing power level among the reflection lights which are pulse modulated. In the prior art, for bringing the timing of the NRZ modulation signal from the modulation circuit 7 into line with the reflection light, there is provided a delay circuit on the substrate. In the laser driver 10 according to the present invention, there can be obtained the NRZ modulation signal as well as the clock signal chCLK being synchronized therewith, and it is so constructed that the recording current signal can be generated corresponding to the NRZ signal through the delay circuit 114 disposed inside, and accordingly the delay circuit 114 is used for that purpose. An output of the delay circuit 114 is transmitted from the laser driver 10 as the monitor signal so as to generate the timing signal for sample-holding the reflection light from the information recording medium 1 based upon the monitor signal, and therefore there is no necessity to provide the delay circuit on the substrate or circuit board separately.

Explanation in more detail will be given by referring to FIGS. 5(i)–5(vi). FIG. 5(i) depicts the NRZ signal, which is the signal which is transmitted from the modulation circuit 7 to the laser driver 10, and it is output as the recording pulse signal shown in FIG. 5(ii) after being delayed by a predetermined delay time ΔT by the delay circuit 114 in the laser driver 10. The predetermined delay time ΔT can be set to be from 8 Tw to 32 Tw, where Tw is a period of the recording frequency. When the semiconductor laser element C 9 is driven at a high output level with the recording pulse signal shown in FIG. 5(ii), a reflection light signal as shown in FIG. 5(iii) can be obtained from the photodetector 16 during the data recording operation.

The reflection light signal, as shown in FIG. 5(iii), can be obtained as a signal depending upon the reflectivity of the optical disc when starting radiation of the light pulse, but after a certain time period has passed, recording is initiated with an increase in the temperature of the recording layer, and therefore the reflection light is lessened. Because this signal component comes to be an external disturbance for the servo signal during the recording operation, a stabilization of the servo signal can be obtained by sampling the reproducing power level within the reflection lights using the gate signal shown in FIG. 5(iv) which can be obtained from one of the monitor signals from the laser driver 10, and by outputting a gate signal (SH signal) being held at the pulse portion thereof from a pre-positioned circuit 14.

Figure 2:
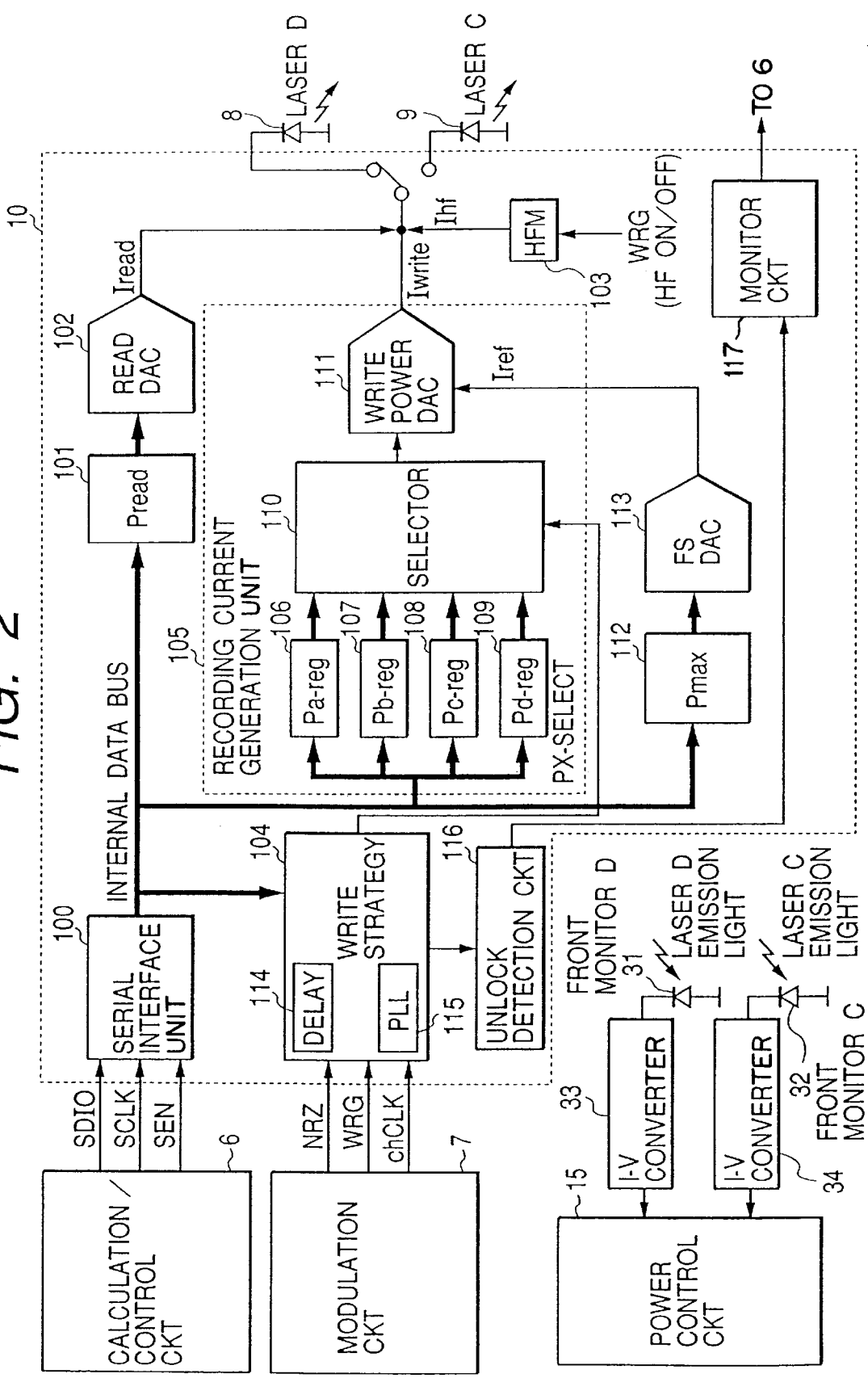
FIG. 2 shows the details of a laser driver being applied according to the present invention.

Also, as shown in FIG. 2, the emission light of the laser element C 9 is received by a front monitor C 32, and is inputted into the power control circuit 15 after being converted into a voltage signal through an I–V converter 34. The front monitor signal can be obtained in the output waveform as shown in FIG. 5(vi) during the recording operation, and the recording pulse level and the reproducing pulse level are respectively sample-held in the power control circuit 15 as shown in FIG. 5(v) using the gate signal shown in FIG. 5(iv) which can be obtained from one of the monitor signals from the laser driver 10, and the respective levels of the recording pulse and the reproducing pulse are transmitted to the calculation/control circuit 6. The calculation/control circuit 6 receives the respective levels of the recording pulse and the reproducing pulse as digital data through an AD converter, and transmits a calculated result of a target value through a serial interface to the laser driver 10, thereby performing a feedback control, so that the Pread value is renewed or updated in the case of the reproducing power, while the Pmax value is renewed or updated in the case of the recording power, thereby achieving the continuous stabilization of the respective powers.

As fully explained above, according to the present invention, recording with high density and with high transfer speed can be achieved.

Furthermore, according to the present invention, it is possible to improve reliability in the recording or reproducing of information data into or from the information recording medium.

What is claimed is:

1. An information recording/reproducing apparatus comprising:

a semiconductor laser;

a laser driver which drives the semiconductor laser to cause the semiconductor laser to emit light;

an optical system which focuses the light emitted from the semiconductor laser on an information recording medium for use in optically recording information on and/or optically reproducing information from the information recording medium;

a photodetector which detects light reflected from the information recording medium, and outputs a reflection light signal;

a modulation circuit which modulates information in accordance with a predetermined rule, and outputs a binary signal representing the modulated information; and a calculation/control circuit which controls the modulation circuit;

wherein the laser driver includes a delay circuit;

wherein the laser driver receives the binary signal outputted from the modulation circuit, generates a recording current signal corresponding to the binary signal through the delay circuit, and transmits an output of the delay circuit to the calculation/control circuit as a monitor signal; and wherein the calculation/control circuit generates a timing signal for sampling and holding the reflection light signal outputted from the photodetector based on the monitor signal.

2. An information recording/reproducing apparatus comprising:

an optical head including:
a semiconductor laser,
a laser driver which drives the semiconductor laser to cause the semiconductor laser to emit light,
a monitor which outputs a light output signal indicative of a light output of the semiconductor laser,
an objective lens which focuses the light emitted from the semiconductor laser on an information recording medium, and
a photodetector which detects light reflected from the information recording medium, and outputs a reflection light signal;

a modulation circuit which modulates information in accordance with a predetermined rule, and outputs a modulation signal representing the modulated information; and a controller circuit which controls the modulation circuit;

wherein the laser driver includes a delay circuit; and wherein the laser driver receives the modulation signal outputted from the modulation circuit, generates a recording current signal corresponding to the modulation signal through the delay circuit, and controls the light output of the semiconductor laser based on an output of the delay circuit while sampling and holding at least one of the light output signal outputted from the monitor and the reflection light signal outputted from the photodetector.

3. A laser driver in an optical head, the optical head including a semiconductor laser which is driven by the laser driver to emit light, a monitor which outputs a light output signal indicative of a light output of the semiconductor laser, an optical system which focuses the light emitted from the semiconductor laser on an information recording medium for use in optically recording information on and/or optically reproducing information from the information recording medium, and an optical detector which detects light reflected from the information recording medium, and outputs a reflection light signal, the laser driver comprising:

a delay circuit;

means for receiving a modulation signal generated by modulating information to be recorded on the information recording medium in accordance with a predetermined rule; and means for generating a recording current signal corresponding to the modulation signal through the delay circuit;

wherein an output of the delay circuit defines a timing for sampling and holding at least one of the light output signal outputted from the monitor and the reflection light signal outputted from the optical detector during control of the light output of the semiconductor laser; and wherein the output of the delay circuit is outputted outside the laser driver as a monitor signal.

4. A laser driver for driving a semiconductor laser to cause the semiconductor laser to emit light to be irradiated on an information recording medium for use in recording information on the information recording medium, the laser driver comprising:

a delay circuit which receives a modulation signal generated by modulating information to be recorded on the information recording medium in accordance with a predetermined rule, and delays the modulation signal; and a recording current signal generating unit which receives an output of the delay circuit, and generates a recording current signal corresponding to the modulation signal, wherein an output of the delay circuit is transmitted outside of the laser driver as a monitor signal so as to control a timing for performing sample/hold of the reflection light from the information recording medium.

5. A method of recording information on an information recording medium by irradiating light emitted from a semiconductor laser on the information recording medium, the method comprising the steps of:

generating a light output signal indicative of a light output of the semiconductor laser;

detecting light reflected from the information recording medium, and generating a reflection light signal;

modulating information to be recorded on the information recording medium in accordance with a predetermined rule, and generating a modulation signal representing the modulated information and a clock signal synchronized with the modulation signal;

controlling the modulating of the information; delaying the modulation signal to produce a delayed modulation signal;

generating a recording current signal corresponding to the modulation signal based on the delayed modulation signal and the clock signal; and controlling the light output of the semiconductor laser based on the delayed modulation signal while sampling and holding at least one of the light output signal and the reflection light signal.

6. A method of driving a semiconductor laser with a laser driver to cause the semiconductor laser to emit light to be irradiated on an information recording medium for use in recording information on the information recording medium, the method comprising the steps of:

receiving a modulation signal generated by modulating information to be recorded on the information recording medium in accordance with a predetermined rule;

delaying the modulation signal to produce a delayed modulation signal;

generating a recording current signal corresponding to the modulation signal based on the delayed modulation signal; and outputting the delayed modulation signal outside the laser driver as a monitor signal, so as to control a timing for performing sample/hold of the reflection light from the information recording medium.

7. An optical head for use in an information recording/reproducing apparatus, comprising:

a laser; and a laser driver configured to drive the laser to emit light for recording and reproducing information onto/from a recording medium, the laser driver comprising a delay circuit arranged to delay a modulation signal obtained by modulating information to be recorded on the recording medium in accordance with a predetermined rule, such that the laser driver can control the light emitted from the laser based on an output of the delay circuit as a monitoring signal, while sampling and holding a reflection light signal obtained from the light reflected from the recording medium.

8. An optical head as claimed in claim 7, further comprising:

an optical system arranged to focus the light emitted from the laser on the recording medium for use in optically recording information onto the recording medium and/or optically reproducing information from the recording medium; and an optical detector arranged to detect light reflected from the recording medium, and output the reflection light signal.

9. An optical head as claimed in claim 7, wherein the laser driver further comprises a recording current generating unit arranged to receive the modulation signal output from the delay circuit, and generate a recording current signal corresponding to the modulation signal.

10. An optical head as claimed in claim 9, wherein the laser driver further comprises:

a PLL circuit arranged to oscillate at a recording frequency of the recording current signal; and an unlock detection circuit arranged to detect an oscillating condition of the PLL circuit, and transmit a detection signal indicative of the oscillating condition of the PLL circuit for controlling the light emitted from the laser.

* * * * *